J. JOHNSON.
ROAD CART.
APPLICATION FILED FEB. 15, 1913.
1,069,703.
Patented Aug. 12, 1913.
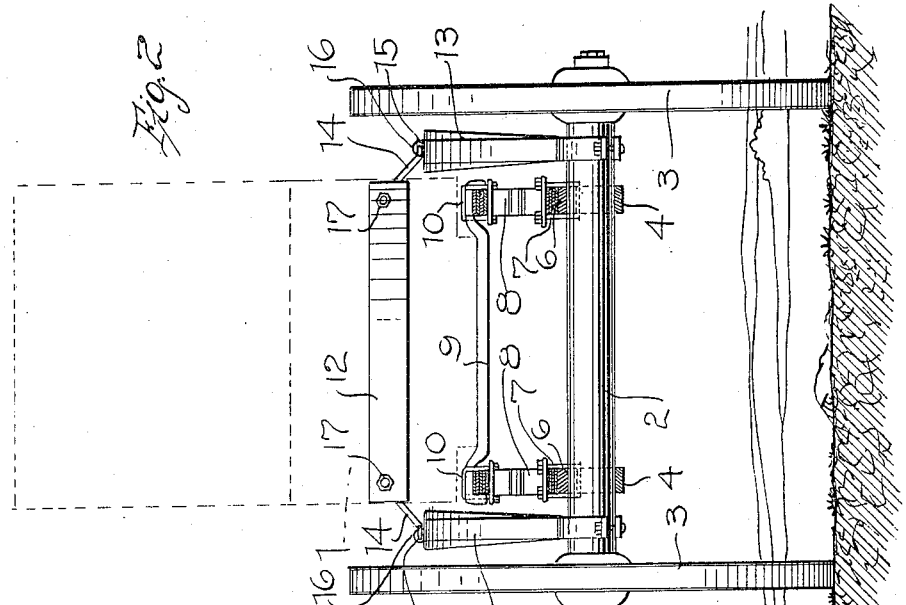
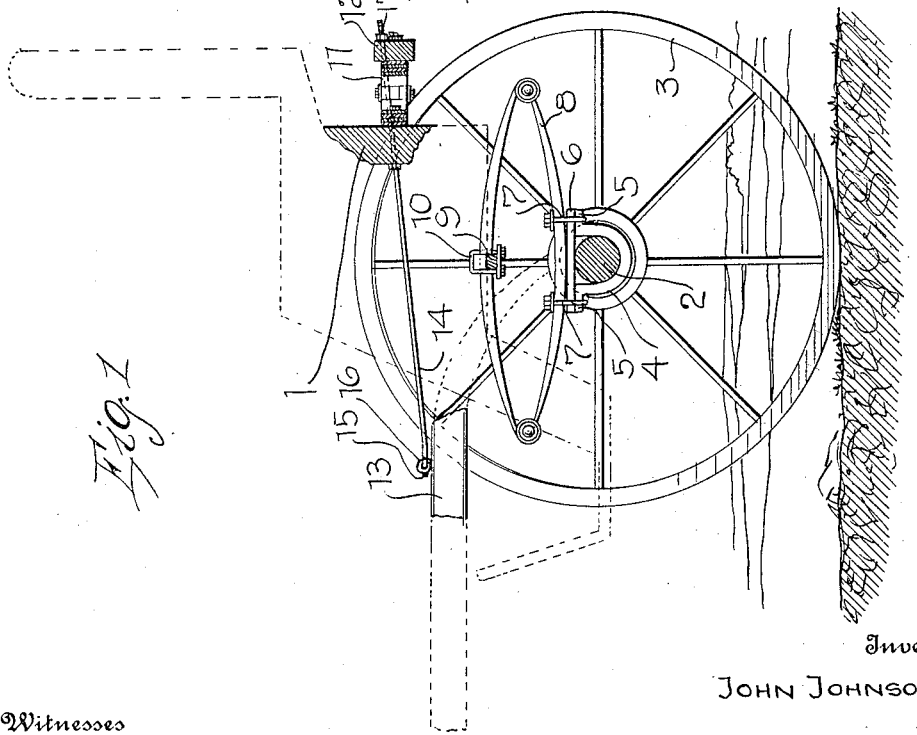
Witnesses
Robert M. Sutphen.
A. I. Hind.
Inventor
JOHN JOHNSON
By Watson E. Coleman
Attorney

UNITED STATES PATENT OFFICE.

JOHN JOHNSON, OF STILES, WISCONSIN.

ROAD-CART.

1,069,703.  Specification of Letters Patent.  Patented Aug. 12, 1913.

Application filed February 15, 1913. Serial No. 748,671.

*To all whom it may concern:*

Be it known that I, JOHN JOHNSON, citizen of the United States, residing at Stiles, in the county of Oconto and State of Wisconsin, have invented certain new and useful Improvements in Road-Carts, of which the following is a specification, reference being had to the accompanying drawings.

This invention relates to new and useful improvements in road-carts and more particularly to the class of two wheeled shaft vehicles, the object of the invention being to provide a cart of this character in which the body is supported to neutralize the horse motion and to prevent shocks from uneven roads or from obstacles, over which the wheels may pass, from being roughly communicated to the body of the vehicle.

Another object of the invention is to provide a cart of the above character which will possess advantages in points of efficiency and durability, which is inexpensive of manufacture and at the same time is simple in construction and operation.

With the above and other objects in view, the invention consists in the novel features of construction and the combination and arrangement of parts to be hereinafter more fully described, pointed out in the claims and shown in the accompanying drawings, in which—

Figure 1 is a side elevation, parts being broken away and in section; and Fig. 2 is a rear elevation, parts being broken away and in section.

Referring more particularly to the drawings, 1 indicates the body of the vehicle, which may be of any suitable form but preferably of the form shown in the accompanying drawings.

The numeral 2 indicates the axle, having the wheels 3 mounted upon each end thereof and which may be of any suitable size or form. Secured to the axle upon the inner side of the wheels are the U-shaped plates 4, the ends of which are extended upwardly upon opposite sides of the axle and bent outwardly as shown at 5, said ends being suitably connected by means of a plate 6, the ends of which are secured to the ends of the plate 4 by means of the bolts 7.

Mounted upon the plates 6 are the elliptical springs 8 which are adapted to support the body 1 upon the axle 2. The body of the vehicle is supported upon the springs 8 by means of the bar 9, the intermediate portion of which is securely bolted to the bottom of the body while the ends thereof are secured, by means of the U-bolts 10, to the top sections of the springs 8. Having its central portion secured to the back side of the body 1 is an elliptical spring 11. Secured to the spring 11 is a transverse bar 12, the ends of which are adjustably secured to the shafts 13 by means of the rods 14. The rods 14 are provided at one end with the eyes 15 which are engaged with the screw eyes 16 carried by the shafts, the other end of said rods are threaded and passed through openings in the ends of the bar 12 and having nuts 17 threaded upon the threaded ends whereby the tension of the spring 11 may be adjusted.

It will be apparent from the drawings that by mounting the springs 8 upon the axle through the medium of the U-shaped plates 4, the body of the vehicle will be relieved from that jerky, up and down movement which is generally imparted to the cart through the movements of the draft animals. It will be apparent that the springs 8 are mounted upon the axle so that they will rock thereon and eliminate this jerky motion. Any longitudinal movement of the body will be neutralized by means of the spring 11, the tension of which may be quickly and readily adjusted by means of the rods 14. Any shocks from uneven roads or from obstacles, over which the wheels may pass will be readily absorbed by both the springs 8 and 11.

From the above description taken in connection with the accompanying drawings, it will be readily apparent that I have provided a road cart of such construction whereby the horse motion, which is generally imparted to the body of the cart, is readily neutralized.

While I have shown and described the preferred form of my invention, it will be obvious that various changes in the details of construction and in the proportions may be resorted to for successfully carrying my invention into practice, without sacrificing any of the novel features or departing from the scope of the appended claims.

What I claim is:—

1. The combination with an axle having shafts connected thereto, of a body yieldably supported upon said axle for rocking movement, an elliptical spring secured to the back of said body and means connected with said spring whereby the same will neutralize the longitudinal movement of the body.

2. The combination with an axle having shafts connected thereto, of elliptical springs mounted for rocking movement upon the axle, a body supported by said springs, an elliptical spring secured to the back of the body and adjustable rods connecting the spring with the shafts whereby the tension of the spring will neutralize the longitudinal movement of the body.

3. The combination with an axle, having shafts connected thereto, of elliptic springs mounted for rocking movement upon the axle, a body supported by said springs, an elliptical spring secured to the back of said body, a bar having its intermediate portion secured to said spring, adjusting rods securing the ends of the bar to the shafts whereby the tension of said spring may be adjusted.

In testimony whereof I hereunto affix my signature in the presence of two witnesses.

JOHN JOHNSON.

Witnesses:
GEORGE YOUNG,
FRED KNUTH.

Copies of this patent may be obtained for five cents each, by addressing the "Commissioner of Patents, Washington, D. C."